(12) United States Patent
Wang et al.

(10) Patent No.: US 11,228,683 B2
(45) Date of Patent: Jan. 18, 2022

(54) SUPPORTING CONVERSATIONS BETWEEN CUSTOMERS AND CUSTOMER SERVICE AGENTS

(71) Applicant: AT&T Intellectual Property I, L.P., Atlanta, GA (US)

(72) Inventors: Yunmiao Wang, Garland, TX (US); Martin Patrick McEnroe, Plano, TX (US); Gary Brian Temerowski, II, Flower Mound, TX (US); Ni An, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/706,370

(22) Filed: Dec. 6, 2019

(65) Prior Publication Data
US 2021/0176361 A1 Jun. 10, 2021

(51) Int. Cl.
| | |
|---|---|
| *H04M 3/53* | (2006.01) |
| *H04M 3/523* | (2006.01) |
| *H04M 3/51* | (2006.01) |
| *G06N 3/08* | (2006.01) |
| *G06Q 30/00* | (2012.01) |

(52) U.S. Cl.
CPC ............ *H04M 3/5315* (2013.01); *G06N 3/08* (2013.01); *G06Q 30/016* (2013.01); *H04M 3/5175* (2013.01); *H04M 3/5237* (2013.01); *H04M 2203/551* (2013.01)

(58) Field of Classification Search
CPC ............. H04M 3/5315; H04M 3/5175; H04M 3/5237; H04M 2203/551; G06N 3/08; G06Q 30/016; G06Q 30/0215; G06Q 30/0643; G06Q 40/025; H04L 9/0637; H04L 2209/38; H04L 65/4084; H04L 65/1069; G06T 19/006
USPC .................. 379/88.13, 88.17, 88.18, 265.01; 345/14.01, 629; 455/556.1
See application file for complete search history.

(56) References Cited

U.S. PATENT DOCUMENTS

| | | | |
|---|---|---|---|
| 9,071,485 B2 * | 6/2015 | Landers ............ | H04L 29/06414 |
| 10,949,714 B2 * | 3/2021 | Gur ...................... | G06K 9/4628 |
| 2010/0238194 A1 * | 9/2010 | Roach, Jr. ............. | H04M 3/493 |
| | | | 345/629 |

(Continued)

*Primary Examiner* — Binh Kien Tieu

(57) ABSTRACT

The present disclosure describes various methods, computer-readable media, and apparatuses for supporting automation of customer service. The automation of customer service may be based on support for automation of conversations between customers and customer service agents. The automation of customer service based on support for automation of conversations between customers and customer service agents may be based on use of images provided by the customers to control the conversations between customers and customer service agents. The support for automation of conversations between customers and customer service agents based on use of images provided by the customers may include processing the images to obtain information for the conversations between the customers and the customer service agents and controlling the conversations between the customers and the customer service agents based on the information for the conversations between the customers and the customer service agents.

20 Claims, 4 Drawing Sheets

(56) References Cited

U.S. PATENT DOCUMENTS

| | | | |
|---|---|---|---|
| 2016/0078449 A1* | 3/2016 | Banerjee | H04L 65/4084 |
| | | | 705/304 |
| 2019/0266661 A1* | 8/2019 | de Sousa Moura | G06Q 40/025 |
| 2019/0295114 A1* | 9/2019 | Pavletic | G06N 3/08 |
| 2020/0097772 A1* | 3/2020 | Nakanishi | G06N 3/084 |
| 2020/0143481 A1* | 5/2020 | Brown | G06Q 40/08 |
| 2020/0143809 A1* | 5/2020 | Lee | G10L 15/22 |
| 2020/0302297 A1* | 9/2020 | Jaganathan | G06K 9/6222 |

* cited by examiner

SUPPORTING CONVERSATIONS BETWEEN CUSTOMERS AND CUSTOMER SERVICE AGENTS

TECHNICAL FIELD

The present disclosure relates generally to customer service, and more particularly to methods, computer-readable media, and apparatuses for supporting automation of customer service.

BACKGROUND

Customer service may be provided to customers in various contexts, such as before, during, and after purchases of goods and services. Customer service provided to customers may be provided in a manual way (e.g., by humans) or in an automated way (e.g., using kiosks, applications, artificial intelligence, and the like).

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
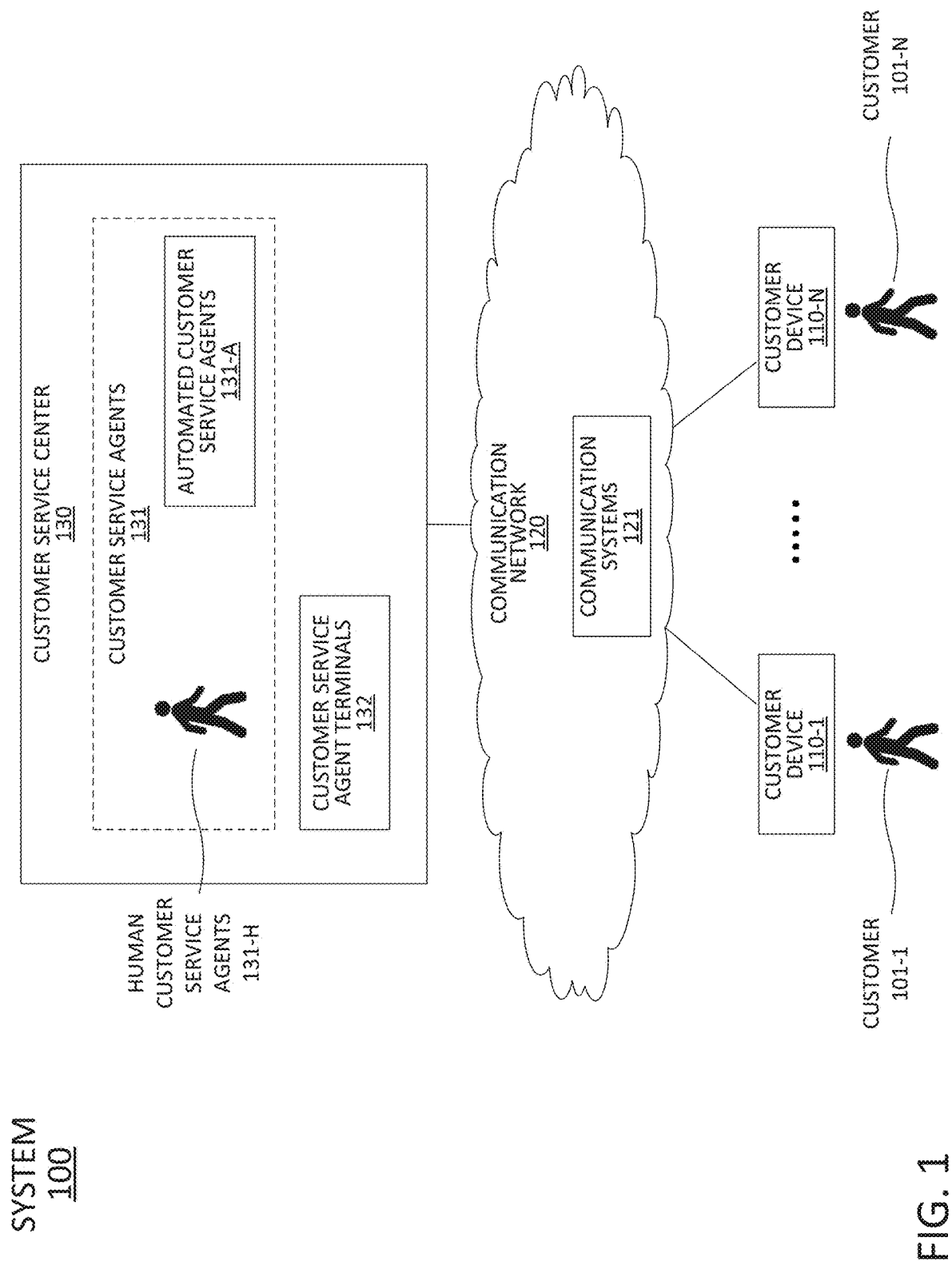
FIG. 1 illustrates an example system configured to support automation of conversations between customers and customer service agents.

The present disclosure describes various methods, computer-readable media, and apparatuses for supporting automation of customer service. The automation of customer service may be based on support for automation of conversations between customers and customer service agents (e.g., human customer service agents, automated customer service agents such as artificial intelligence (AI) based chatbots, and so forth). The automation of customer service based on support for automation of conversations between customers and customer service agents may be based on use of images provided by the customers to control various aspects of the conversations between the customers and the customer service agents. The support for automation of conversations between customers and customer service agents based on use of images provided by the customers may include processing the images to obtain information for the conversations between the customers and the customer service agents and controlling the conversations between the customers and the customer service agents based on the information for the conversations between the customers and the customer service agents. The automation of customer service based on support for automation of conversations between customers and customer service agents may be based on various other capabilities as discussed further herein.

In one example, a method includes sending, by a processing system including at least one processor, a request for an image associated with a conversation between a customer service agent and a customer, receiving, by the processing system, the image associated with the conversation between the customer service agent and the customer, processing, by the processing system, the image associated with the conversation between the customer service agent and the customer to obtain information for the conversation between the customer service agent and the customer, and controlling, by the processing system based on the information for the conversation between the customer service agent and the customer, continuation of the conversation between the customer service agent and the customer.

In one example, a processing system includes at least one processor and a computer-readable medium storing instructions which, when executed by the processing system, cause the processing system to perform operations, the operations including sending a request for an image associated with a conversation between a customer service agent and a customer, receiving the image associated with the conversation between the customer service agent and the customer, processing the image associated with the conversation between the customer service agent and the customer to obtain information for the conversation between the customer service agent and the customer, and controlling, based on the information for the conversation between the customer service agent and the customer, continuation of the conversation between the customer service agent and the customer.

In one example, a method includes receiving, by a processing system including at least one processor, a request for an image associated with a conversation between a customer service agent and a customer, obtaining, by the processing system, the image associated with the conversation between the customer service agent and the customer, sending, by the processing system, the image associated with the conversation between the customer service agent and the customer, and receiving, by the processing system within the conversation between the customer service agent and the customer, a message including information for the conversation between the customer service agent and the customer, wherein the information for the conversation between the customer service agent and the customer is based on the image associated with the conversation between the customer service agent and the customer.

In one example, a processing system includes at least one processor and a computer-readable medium storing instructions which, when executed by the processing system, cause the processing system to perform operations, the operations including receiving a request for an image associated with a conversation between a customer service agent and a customer, obtaining the image associated with the conversation between the customer service agent and the customer, sending the image associated with the conversation between the customer service agent and the customer, and receiving, within the conversation between the customer service agent and the customer, a message including information for the conversation between the customer service agent and the customer, wherein the information for the conversation between the customer service agent and the customer is based on the image associated with the conversation between the customer service agent and the customer.

These and various other aspects of the present disclosure are discussed in greater detail below in connection with the examples of FIGS. 1-4.

FIG. 1 illustrates an example system configured to support automation of conversations between customers and customer service agents.

The system 100 may be configured to support customer service for a set of customers 101-1 to 101-N (collectively, customers 101). The customers 101 may be customers of one or more entities (e.g., companies, organizations, and the like) which may provide customer service for the customers 101 and, thus, may have relationships with the entities which may provide customer service for the customers 101. The customers 101 may receive customer service within various contexts, such as within the contexts of customer support (e.g., product support, service support, and the like), electronic commerce (e-commerce), entertainment, education, news, finance, healthcare, travel, and so forth. It will be appreciated that, although primarily presented herein with respect to supporting automation of conversations of customers 101 within specific customer service contexts (e.g., primarily within the context of technical support), automaton of conversations of customers 101 may be provided within various other customer service contexts.

The system 100 includes a set of customer devices 110-1 to 110-N (collectively, customer devices 110) of the set of customers 101-1 to 101-N (collectively, customers 101), respectively, a communication network 120, and a customer service center 130.

The customers 101 may use the customer devices 110 to interact with the customer service center 130. It will be appreciated, as discussed further below, that the customer devices 110 may or may not be related to the relationship between the customers 101 and the entity for which customer service is provided by the customer service center 130.

In one example, the customer devices 110 of the customers 101 may be related to the relationship between the customers 101 and the entity for which customer service is provided by the customer service center 130. For example, the customers 101 may be customers of an end user device company from which the customers 101 may buy or rent the customer devices 110, the customers 101 may be customers of a telecommunications service provider from which the customers 101 may obtain telecommunications services using the customer devices 110, and so forth.

In one example, the customer devices 110 of the customers 101 may be unrelated to the relationship between the customers 101 and the entity for which customer service is provided by the customer service center 130. For example, the customer devices 110 may be devices via which the customers 101 are able to interact with the company within the context of receiving customer service from the company, even though the customer service may be unrelated to the customer device 110. For example, a customer 101 may call customer service via a customer device 110 regarding a cable service subscribed to by the customer 101, initiate a chat session with customer service via a customer device 110 regarding a product purchased by the customer 101, and so forth.

The customer devices 110 of the customers 101 may include any devices via which the customers 101 may interact with the customer service center 130 for obtaining customer service from the customer service center 130. For example, the customer devices 110 may be desktop computers, laptop computers, tablet computers, smartphones, wearable devices, smart televisions, gaming systems, and so forth.

The communication network 120 may include one or more types of communication networks which may support communications between the customers 101 using customer devices 110 and the customer service center 130. For example, the communication network 120 may include a traditional circuit switched network (e.g., a public switched telephone network (PSTN)). For example, the communication network 120 may include a packet network, such as an Internet Protocol (IP) network (e.g., a Voice over IP (VoIP) network, a Service over IP (SoIP) network, an IP Multimedia Subsystem (IMS) network, and the like), an asynchronous transfer mode (ATM) network, a wireless network (e.g., a cellular network such as a 2G network, a 3G network, a 4G network, a long term evolution (LTE) network, a 5G network, and the like), and so forth. It will be appreciated that the communication network 120 may include one or more access networks, one or more core networks, and so forth.

The communication network 120 includes communication systems 121 configured to support communications between the customers 101 using customer devices 110 and the customer service center 130. For example, communication systems 121 may include network elements (e.g., access devices (e.g., base transceiver stations (BTSs), WiFi access points (APs), and so forth), routers, switches, hubs, and so forth), network control devices, virtualization infrastructure configured to support network function virtualization (NFV) based on virtualized network functions (VNFs), servers configured to support various applications (e.g., policy servers, mobility servers, web servers, content servers, and the like), management systems, and so forth.

The customer service center 130 may be configured to provide customer service for the customers 101. The customer service center 130 may be configured to provide customer service for the customers 101 based on various customer service support functions supported by the customer service center 130. For example, customer service support functions may include customer communication functions for supporting communications with customers 101, customer information management functions for managing (e.g., collecting, maintaining, accessing, and the like) customer information for supporting customer service for the customers 101 (e.g., account information, preference information, and the like), customer service functions (e.g., customer care functions, customer experience management functions, and the like), and so forth. It will be appreciated that the customer service support functions supported by the customer service center 130 may vary across entities (e.g., based on entity types of the entities, customer service contexts of the entities, and the like), may vary across customers 101, and so forth. The customer service center 130 may be configured to support customer service support functions based on various communication types which may be used by the customers 101 (e.g., text-based communications, audio-based communications, video-based communications, and so forth). The customer service center 130 may be configured to support various other functions for providing customer service for the customers 101.

For example, where the entity is a telecommunications service provider and the customers 101 utilize telecommunications services of the telecommunications service provider, the customer service support functions supported by the customer service center 130 may include telecommunications service technical support functions. For example, telecommunications service technical support functions may include technical support for telecommunications services (e.g., problems accessing or using the service), technical support for devices via which customers 101 access telecommunications services (e.g., customer devices 110 or other devices), and so forth.

For example, where the entity is an end user device provider and the customers 101 purchase or rent end user devices (e.g., desktop computers, laptop computers, tablet computers, smartphones, and the like), the customer service support functions supported by the customer service center 130 may include end user device technical support functions. For example, end user device technical support functions may include technical support for issues with end user devices (e.g., problems with network connectivity, problems with software updates, and so forth).

For example, where the entity is an e-commerce company that sells products online, the customer service support functions supported by the customer service center 130 may include product support functions. For example, product support functions may include support for finding products of interest, support for researching products of interest, support for ordering products, support for tacking delivery of products, support for issues with products, support for returning or exchanging products, and so forth.

It will be appreciated that the foregoing examples represent merely a few of types of entities for which customer service center 130 may provide customer service to the customers 101.

The customer service center 130 includes customer service agents 131 which may provide customer service to the customers 101 based on various customer service support functions supported by the customer service center 130. The customer service agents 131 may include a set of human customer service agents 131-H which may interact with customers 101 using customer service agent terminals 132 and a set of automated customer service agents 131-A. The customer service agents 131 may be able to communicate with the customers 101 using various types of communications (e.g., text, audio, video, and so forth).

The human customer service agents 131-H, as indicated above, may interact with the customers 101 to provide customer service functions for the customers 101. The human customer service agents 131-H interact with the customers 101 using the customer service agent terminals 132. The customer service agent terminals 132 may include any devices and capabilities which may be used by the human customer service agents 131-H to interact with customers 101. For example, for text-based interaction between the human customer service agents 131-H and the customers 101, the customer service agent terminals 132 may be configured to enable the human customer service agents 131-H to accept chat sessions initiated by customers 101, view chat messages sent by customers 101, send chat messages to customers 101, add other customer service agents 131 to chat sessions with customers 101, and so forth. For example, for voice-based interaction between the human customer service agents 131-H and the customers 101, the customer service agent terminals 132 may be configured to enable the human customer service agents 131-H to view calls in a queue of pending calls to be handled, select calls to answer calls of customers 101, interact with customers 101 verbally, terminate calls with customers 101, add other customer service agents 131 to calls, transfer calls of customers 101 to other customer service agents 131, and so forth. For example, the customer service agent terminals 132 may include workstations, computers, smartphones, applications (e.g., running on physical devices or resources, virtual resources (e.g., virtual machines (VMs), virtual containers (VCs), and the like), and the like), and so forth. It will be appreciated that references herein to functions performed by a customer service agent 131, in the case of a human customer service agent 131-H, may be performed by one or more elements on behalf of the human customer service agent 131-H (e.g., by the customer service agent terminal 132 or other devices or elements). The human customer service agents 131-H may provide various other customer service functions for the customers 101.

The automated customer service agents 131-A, as indicated above, may interact with the customers 101 to provide customer service functions for the customers 101. The automated customer service agents 131-A may be automated in various ways based on various automation technologies. The automated customer service agents 131-A may be based on artificial intelligence (AI). The automated customer service agents 131-A may be chatbots. For example, the automated customer service agents 131-A may include chatbots configured to communicate with customers 101 using text, audio, and so forth. For example, the automated customer service agents 131-A may include chatbots which may have text-based interfaces, video-based interfaces, and so forth. The automated customer service agents 131-A may be provided using physical devices or resources, virtual resources (e.g., VMs, VCs, and the like), and so forth. It will be appreciated that references herein to functions performed by a customer service agent 131, in the case of an automated customer service agent 131-A, may be performed by the automated customer service agent 131-A, by one or more elements on behalf of the automated customer service agent 131-A, and so forth. The automated customer service agents 131-A may provide various other customer service functions for the customers 101.

The customer service center 130 is configured to support automation of conversations between customers 101 and customer service agents 131. The support for automation of conversations between customers 101 and customer service agents 131 may be based on use of images provided by the customers 101 to the customer service agents 131. The support for automation of conversations between customers 101 and customer service agents 131, based on use of images provided by the customers 101 to the customer service agents 131, may include processing of the images provided by the customers 101 to the customer service agents 131 to obtain information for the conversations between the customers 101 and the customer service agents 131 and controlling the conversations between the customers 101 and the customer service agents 131 based on the information for the conversations between the customers 101 and the customer service agents 131. The conversations between the customers 101 and the customer service agents 131 may be controlled by controlling, based on the information obtained based on processing of images provided by the customers 101, continuation of the conversations with the customers 101 (e.g., directing or attempting to direct the conversations, steering or attempting to steer the conversations, and so forth). It will be appreciated that the customer service center 130 may be configured to support various other functions for supporting automation of conversations between customers 101 and customer service agents 131.

The customer service center 130, as indicated above, is configured to support automation of conversations between customers 101 and customer service agents 131 based on images provided to the customer service agents 131 by the customers 101. Here, the idea that a "picture is worth a thousand words" may be leveraged within the context of a conversation between a customer 101 and a customer service agent 131 to support automation of the conversation between the customer 101 and the customer service agent 131. More specifically, within the context of a conversation between a customer 101 and a customer service agent 131, an image provided by the customer 101 may be processed by the customer service agent 131 to obtain information which may be useful to the customer service agent 131 within the context of the conversation, but which might otherwise be more difficult for the customer service agent 131 to obtain from the customer 101 based on a typical conversational interaction between the customer 101 and the customer service agent 131 (e.g., based on one or more questions posed by the customer service agent 131 to the customer 101 that the customer 101 may answer incorrectly, may struggle to answer, or may not be able to answer at all). For example, when running a hardware diagnostic, a chatbot may request that a customer check the connection between different ports or provide the readings on a front panel, and the customer can fail in several ways (e.g., having difficulty in identifying the right port, providing the reading from a wrong input, and the like). Similarly, for example, when providing support for product purchases, a chatbot may request the model number of the product that the customer would like to purchase, and the customer can fail in several ways (e.g., having difficulty in identifying model number, providing the wrong model number, and the like). It will be appreciated that these are merely a few examples of situations in which the idea that a "picture is worth a thousand words" may be leveraged within the context of a conversation between a customer 101 and a customer service agent 131 to improve various aspects of the conversation between the customer 101 and the customer service agent 131.

The customer service center 130, as indicated above, is configured to support automation of conversations between customers 101 and customer service agents 131 based on images provided to the customer service agents 131 by the customers 101. It will be appreciated that the images that are used to support automation of conversations between customers 101 and customer service agents 131 may vary in a number of ways. For example, the images may vary across customers 101 of the same entity (e.g., for different needs of different customers 101 of the same entity, for different customers 101 for which customer service may be different, and the like), across different entities for which customer service may be different (e.g., a product provider versus a service provider, an e-commerce company versus an Internet service provider, and the like), and so forth. For example, where the entity is a smartphone provider, the image may be a screenshot of the screen of the smartphone of the customer 101 (e.g., showing information such as a model number, serial number, installed software version, and the like). For example, where the entity is a computer support service provider, the image may be an image of the back of a desktop computer of the customer 101 (e.g., showing whether the proper devices are plugged into the desktop computer, showing the configuration of cables of the desktop computer, and the like). For example, where the entity is an Internet service provider, the image may be an image of a modem and/or a wireless router of the customer 101 (e.g., an image of the front panel showing which lights are illuminated, an image of the back showing the arrangement of ports and connections, and the like). For example, where the entity is an e-commerce company, the image may be an image of a product needed by the customer 101. For example, where the entity is a travel company, the image may be an image related to travel of the customer 101 (e.g., an image of a boarding pass of the customer 101, an image of a place that the customer 101 would like to visit, and the like). It will be appreciated that the images used for supporting automation of conversations between customers 101 and customer service agents 131 may vary in many other ways.

The customer service center 130, as indicated above, is configured to support automation of conversations between customers 101 and customer service agents 131 based on images provided by the customers 101. As discussed above, for a given conversation between a given customer 101 and a given customer service agent 131, the customer 101 and the customer service agent 131 may participate in a process in which the customer service agent 131 requests an image from the customer 101 based on the conversation between the customer 101, the customer 101 obtains the image and provides the image to the customer service agent 131, and the customer service agent 131 receives the image from the customer 101 and processes the image to control continuation of the conversation between the customer 101 and the customer service agent 131 based on the image from the customer 101. A description of various aspects of this process follows.

The customer 101 and the customer service agent 131 participate in a conversation. The conversation between the customer 101 and the customer service agent 131 may be initiated by the customer 101 (e.g., where the customer 101 initiates a chat session with the customer service agent 131 to try to request assistance with a problem, to request information about a topic, and the like) or by a customer service agent 131 (e.g., where the customer service agent 131 initiates a chat session in response to a previous request for help from the customer 101, to preemptively inform the customer 101 regarding a problem or potential problem of which the customer 101 may or may not yet be aware, to preemptively make a recommendation to the customer 101, and the like). It will be appreciated that the conversation between the customer 101 and the customer service agent 131 may be initiated for various other purposes, may be initiated in various other ways, and so forth.

The customer service agent 131, based on the conversation between the customer 101 and the customer service agent 131, requests an image from the customer 101. The customer service agent 131 requests an image associated with the conversation between the customer 101 and the customer service agent 131, which may be analyzed to determine information which may be used to improve various aspects of the conversation between the customer 101 and the customer service agent 131 (e.g., improved conversational quality, more efficient interactions, and so forth).

The customer service agent 131 may request the image from the customer 101 based on a determination by the customer service agent 131 to request the image from the customer 101. The customer service agent 131 may request the image from the customer 101 automatically (e.g., where images are requested from customers 101 in every conversation). The customer service agent 131 may request the image from the customer 101 selectively (e.g., where images are not necessarily requested from customers 101 in every conversation). The customer service agent 131 may request the image from the customer 101 based on a determination that the image may be useful within the context of the conversation with the customer 101. The customer service agent 131 may request the image from the customer 101 based on a determination that the image might include information which may be used by the customer service agent 131 to improve one or more aspects of the conversation. The customer service agent 131 may request the image from the customer 101 based on a workflow with which the conversation is associated, one or more options selected or provided by the customer 101 when initiating the conversation (e.g., a need of the customer 101, a problem type faced by the customer 101, and the like), content detected within the conversation (e.g., one or more keywords or phrases indicative of a need of the customer 101, one or more keywords or phrases indicative of a problem faced by customer 101, and the like), and so forth. It will be appreciated that the determination by the customer service agent 131 to request the image from the customer 101 may be performed in various other ways.

The customer service agent 131, based on a determination to request an image from the customer 101, may determine a type of image to request from the customer 101. The type of image to request from the customer 101 may be the same for all conversations between customers 101 and customer service agents 131 or may vary across conversations between customers 101 and customer service agents 131. The customer service agent 131 may determine the type of image to request from the customer 101 based on a determination as to the type of image that may be useful within the context of the conversation with the customer 101. The customer service agent 131 may determine the type of image to request from the customer 101 based on a determination as to the type of image that would include information which may be used by the customer service agent 131 to improve one or more aspects of the conversation. The customer service agent 131 may determine the type of image to request from the customer 101 based on a workflow with which the conversation is associated, one or more options selected or provided by the customer 101 when initiating the conversation (e.g., a reason for the conversation, a problem type, and the like), content detected within the conversation (e.g., one or more keywords or phrases indicative of the reason for the conversation, one or more keywords or phrases indicative of potential problem types which triggered the conversation, and the like), and so forth. It is noted that the determination by the customer service agent 131 as to the type of image to request from the customer 101 may be performed in various other ways.

The customer service agent 131, based on a determination to request an image from the customer 101, may request the image from the customer 101 by sending a request for the image to the customer 101. The customer service agent 131 may send the request for the image to the customer 101 via the customer device 110 or any other suitable device via which the customer 101 may receive the request for the image. The customer service agent 131 may send the request for the image to the customer 101 within the context of the conversation, and the request may be a request for the image to be provided within the context of the conversation or a request for the image to be provided via a communication channel outside of the context of the conversation. The customer service agent 131 may send the request for the image to the customer 101 outside the context of the conversation, and the request may be a request for the image to be provided within the context of the conversation or a request for the image to be provided via a communication channel outside of the context of the conversation. The request for the image that is sent to the customer 101 may include a description of the image being requested from the customer 101 (e.g., of the target of the image, information that needs to be captured in the image, an angle from which the image needs to be captured, a maximum size permitted for the image, a format type for the image, and the like). It will be appreciated that the customer service agent 131 may request the image from the customer 101 in various other ways.

The customer 101 receives the request for the image from the customer service agent 131. As discussed above in conjunction with a description of the manner in which the customer service agent 131 requests the image from the customer 101, the customer 101 may receive the request for the image from the customer service agent 131 in various ways. For example, the customer 101 may receive the request for the image from the customer service agent 131 via the customer device 110, or another suitable device to which the customer 101 has access, within the context of the conversation (e.g., via a chat session in which the conversation is taking place). For example, the customer 101 may receive the request for the image from the customer service agent 131 via the customer device 110, or another suitable device to which the customer 101 has access, outside of the context of the conversation. It will be appreciated that the customer 101 may receive the request for the image from the customer service agent 131 in various other ways.

The customer 101 obtains the image in response to the request for the image from the customer service agent 131. The customer 101 may obtain the image by capturing the image in response to the request for the image (e.g., using the customer device 110, using another device available to the customer 101, and the like), retrieving a previously captured image (e.g., locally from the customer device 110, from another device available to the customer 101, and the like), and so forth. The customer 101 may capture the image by taking a photo with a camera (e.g., a built-in camera of the customer device 110 or other suitable camera), by performing a screen capture (e.g., to capture an image of the screen of the customer device 110 or other suitable device from which the image is captured), and so forth. It will be appreciated that the customer 101 may obtain the image in various other ways.

The customer 101 provides the image to the customer service agent 131. The customer 101 may send the image to the customer service agent 131 via the customer device 110 or any other suitable device via which the customer 101 may provide the image to the customer service agent 131. The customer 101 may provide the image to the customer service agent 131 within the context of the conversation or outside of the context of the conversation. It will be appreciated that the customer 101 may provide the image to the customer service agent 131 in various other ways.

The customer service agent 131 receives the image from the customer 101. As discussed above in conjunction with a description of the manner in which the customer 101 provides the image to the customer service agent 131, the customer service agent 131 may receive the image from the customer 101 in various ways (e.g. from the customer device 110 within the context of the conversation (e.g., via a chat session in which the conversation is taking place), from the customer device 110 outside of the context of the conversation, from another device to which the customer 101 has access, and the like). It will be appreciated that the customer service agent 131 may receive the image from the customer 101 in various other ways.

The customer service agent 131 processes the image to determine information for the conversation. The processing of the image to determine the information for the conversation may be performed using various techniques, models, algorithms, and so forth. The information for the conversation may be a need of the customer 101 (e.g., a question of the customer 101, an item of information for the customer 101, and the like), an answer for the customer 101, and so forth. The image may be processed to determine various types of information for the conversation and the image may be processed in various ways to determine the information for the conversation, as discussed further below.

In one example, the processing of the image to determine the information for the conversation between the customer service agent 131 and the customer 101 may include processing the image using an image caption model. The image caption model may be based on neural approaches, machine learning, and so forth. The image caption model may use a convolutional neural network (CNN) for extracting a set of features of the image and one or more downstream models for processing the set of features of the image to obtain the information for the conversation. The image caption model enables processing of images in a pre-trained format that ensures that the associated output (i.e., the information for the conversation between the customer 101 and the customer service agent 131) has a consistent format that the customer service agent can understand.

In one example, the processing of the image to determine the information for the conversation between the customer service agent and the customer may include processing the image using an image processing model to obtain a set of features of the image and processing the set of features of the image using one or more downstream models to obtain the information for the conversation. The image processing model that is used may be a CNN, an example of which is presented with respect to FIG. 2. The one more downstream models may include an information generation model (e.g., a neural network model or other suitable type of information generation model), an information extraction model (e.g., a classification model, a prediction model, and the like), and so forth. It will be appreciated that the one or more downstream models that are used may depend on the type of information being determined for the conversation (e.g., generating a question for the customer versus determining an answer for the customer or other types of information that may be produced for the conversation). It will be appreciated that various other types of information may be determined based on processing of the image using image processing models and using various downstream models for analyzing features extracted from the image using image processing models.

In one example, the information for the conversation may be a need of the customer (e.g., a question of the customer that has been determined or predicted for the customer 101 without the customer 101 actually having asked the question). The need of the customer 101 may be determined based on processing of the set of features of the image (e.g., determined using an image processing model such as a CNN or other image processing model or technique) using an information generation model. The information generation model may be a neural network model or other model or technique configured to process a set of features of an image in order to generate information based on the image (e.g., to generate text which describes the need of the customer 101). For example, the information that is generated based on processing of the set of features of the image may include questions, such as questions related to hardware or software diagnostics in an information technology service context, questions related to products and services in an e-commerce context, and the like. It will be appreciated that various other types of models may be used to determine the need of the customer 101 based on processing of features extracted from the image. It will be appreciated that various other types of needs of the customers 101 (e.g., other than questions as primarily discussed above) may be determined and represented using various information generation models configured to operate downstream of image processing models.

In one example, the information for the conversation may be an answer for a customer 101 (e.g., an answer to a question posed by the customer 101, an answer to a question of the customer 101 that has been predicted (e.g., predicted based on processing of the image as discussed above), an answer to a question of the customer service agent 131, and the like). The answer for the customer 101 may be determined based on processing of the set of features of the image (e.g., determined using an image processing model such as a CNN or other image processing model or technique) using one or more information extraction models, such as one or more of a classification model, a prediction model, and the like. For example, the information that is determined based on processing of the set of features of the image may include answers, such as answers related to hardware or software diagnostics in an information technology service context, answers related to products and services in an e-commerce context, and the like. It will be appreciated that various other types of models may be used to determine the answer for the customers 101 based on processing of features extracted from the image. It will be appreciated that various other types of information for the customers 101 (e.g., other than answers as primarily discussed above) may be determined and represented using various information extraction models configured to operate downstream of image processing models.

It will be appreciated that various aspects of analyzing the image to determine the information for the conversation (e.g., the number of models used, the type(s) of model(s) used, and so forth) may depend on various factors, such as the context of the conversation, the type of information for the conversation that is to be determined, the manner in which the conversation is to be continued, and so forth.

The customer service agent 131 uses the information for the conversation to control continuation of the conversation. The customer service agent 131 may control continuation of the conversation by directing or attempting to direct the conversation, steering or attempting to steer the conversation, and so forth. The customer service agent 131 may control continuation of the conversation, based on the information for the conversation, by sending the information for the conversation to the customer 101. The information for the conversation may be sent to the customer 101 within the context of the conversation (e.g., textually in a text-based conversation by sending the information in a message, aurally in a voice-based conversation using a text-to-voice conversation of the information for the conversation, and so forth). The information for the conversation, as indicated hereinabove, may include a need (e.g., a question or other need), an answer, or other types of information (e.g., a recommendation and the like), and so forth. The information for the conversation may be sent to the customer 101 for triggering the customer 101 to continue the conversation (e.g., providing the information in conjunction with a request for the customer 101 to confirm the information (e.g., confirm a need of the customer 101) to the customer service agent 131, providing the information where the information will trigger the customer to send one or more additional messages to the customer service agent 131, and the like). The customer service agent 131 may perform one or more other actions for the customer 101 based on the information for the conversation.

For example, the customer service agent 131 may determine a need of the customer 101 and send the need of the customer 101 to the customer 101 within the context of the conversation. The need of the customer 101 may be a question or other need. The need of the customer 101 may be sent to the customer 101 along with a request for the customer 101 to confirm the need of the customer 101. The use of the image for this purpose may obviate the need for the customer 101 to specify his or her need (e.g., if the customer 101 is having trouble articulating the need or does not quite know what is needed) and also may obviate the need for the customer service agent 131 to interact with the customer 101 conversationally (e.g., eliminating one or more rounds of interaction that may be difficult for the customer 101 and/or the customer service agent 131, may be time consuming, and so forth) in order to determine the need of the customer 101, thereby improving the efficiency of the conversation between the customer 101 and the customer service agent 131 for enabling the customer service agent 131 to support the customer 101.

For example, the customer service agent 131 may determine an answer for the customer (e.g., based on a question asked by the customer 101, a question predicted for the customer 101, and the like) and send the answer for the customer 101 to the customer 101 within the context of the conversation. The use of the image for this purpose may obviate the need for the customer 101 to ask one or more questions in order to get an answer (e.g., if the customer 101 is having trouble articulating the question or does not quite know what question needs to be asked) and also may obviate the need for the customer service agent 131 to interact with the customer 101 conversationally (e.g., eliminating one or more rounds of interaction that may be difficult for the customer 101 and/or the customer service agent 131, may be time consuming, and so forth) in order to determine an answer needed by the customer 101, thereby improving the efficiency of the conversation between the customer 101 and the customer service agent 131 for enabling the customer service agent 131 to support the customer 101.

It will be appreciated that the customer service agent 131 may use the information for the conversation to control continuation of the conversation in various other ways.

It will be appreciated control over continuation of the conversation by the customer service agent 131 results in additional interaction between the customer service agent 131 and the customer 101 within the context of the conversation and, thus, that the customer device 110 may perform various additional functions associated with control over continuation of the conversation by the customer service agent 131 (e.g., receiving additional messages or information and presenting the additional messages or information to the customer 101, allowing the customer 101 to send additional messages or information to the customer service agent 131, and the like).

The customer device 110 receives the information for the conversation that is sent by the customer service agent 131 and presents the information to the customer 101 via the customer device 110. The customer 101 may then further interact with the customer service agent 131 within the context of the conversation using the customer device 110. For example, where the information for the conversation is a question predicted by the customer service agent 131 for the customer and the question is sent with a request that the customer 101 confirm that the question is correct, the customer 101 may respond with a YES or NO message to indicate whether the question predicted for the customer 101 is correct. For example, where the information for the conversation is an answer determined by the customer service agent 131 for the customer 101, the customer 101 may respond by thanking the customer service agent 131 for the answer and ending the conversation, asking one or more follow up questions based on the answer, and the like. It will be appreciated that continuation of the conversation may result in various other actions at the customer device 110 of the customer 101.

It will be appreciated that the conversation between the customer 101 and the customer service agent 131 may continue in this manner until the conversation is ended (e.g., by the customer 101 or the customer service agent 131) and that continuation of the conversation between the customer 101 and the customer service agent 131 may involve various interactions, processing of additional images (e.g., requested by the customer service agent 131 and provided by the customer 101) for various purposes, and so forth.

It will be appreciated that the customer devices 110 and the customer service agents 131 each may be configured to perform various other functions for supporting automation of conversations between customers 101 and customer service agents 131.

It will be appreciated that, although primarily presented herein with respect to examples in which various functions for using images provided by customers 101 to support automation of conversations between customers 101 and customer service agents 131 are performed by the customer service agents 131, various functions for using images provided by customers 101 to support automation of conversations between customers 101 and customer service agents 131 may be performed by various elements of the customer service center 130 (e.g., by customer service agent terminals 132 for the human customer service agents 131-H, by the automated customer service agents 131-A involved in the conversations for automated customer service agents 131-A, by one or more other devices of the customer service center 130 (omitted for purposes of clarity) which may be configured to provide such functions for customer service agents 131, and so forth).

It will be appreciated that the system 100 has been simplified. Thus, it should be noted that the system 100 may be implemented in a different form than that which is illustrated in FIG. 1. For example, system 100 may be expanded by including additional networks, devices, and so forth, without altering the scope of the present disclosure. For example, the system 100 may be altered to omit various elements, substitute elements for devices that perform the same or similar functions, combine elements that are illustrated as separate devices, and/or implement network elements as functions that are spread across several devices that operate collectively as the respective network elements, without altering the scope of the present disclosure. In addition, the system 100 may include other network elements (not shown) such as policy servers, security devices, and the like. It will be appreciated that the system 100 may be modified in various other ways while still supporting conversations between customers and customer service agents in accordance with the present disclosure. Thus, these and other modifications are contemplated within the scope of the present disclosure.

Figure 2:
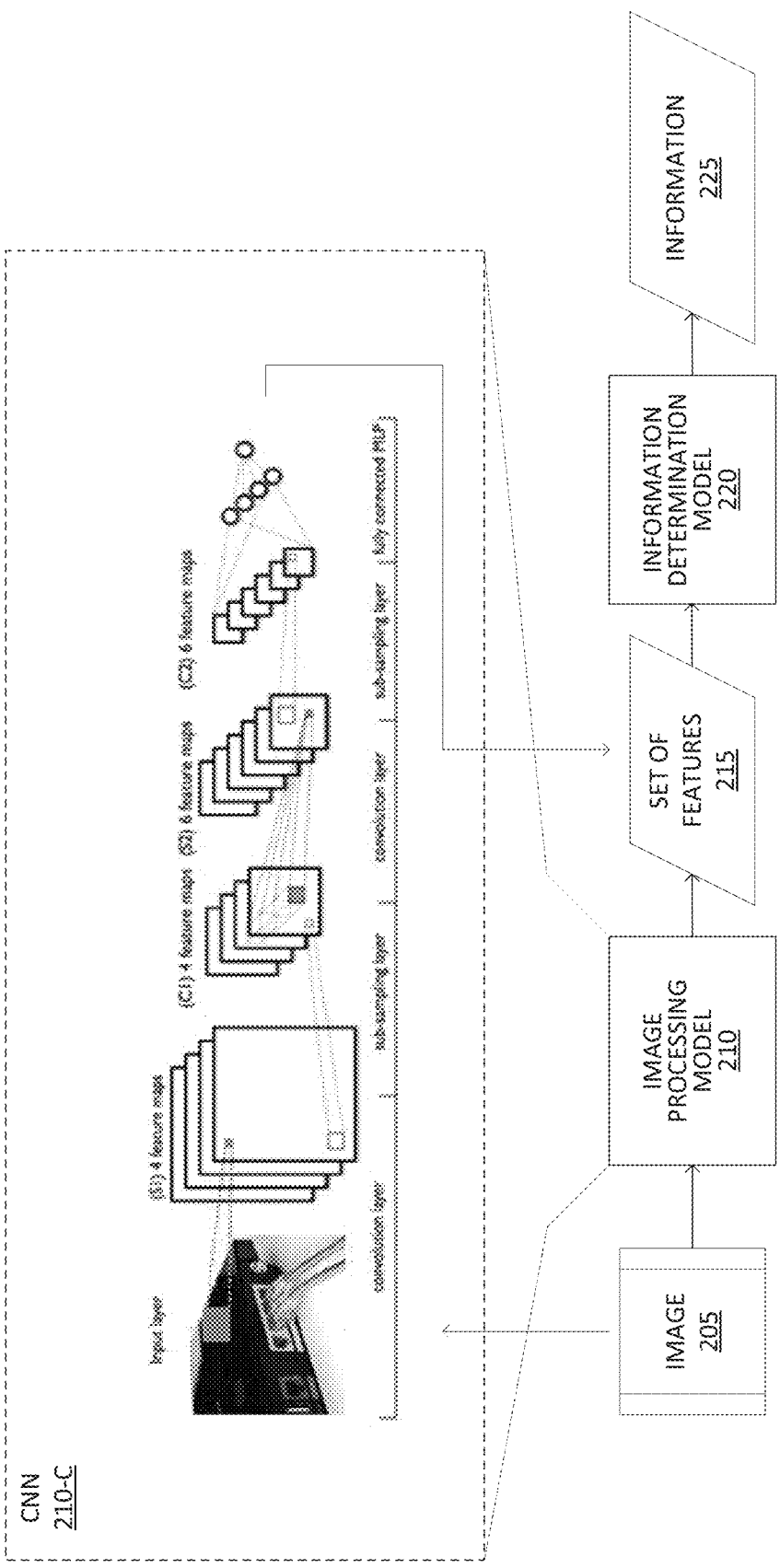
FIG. 2 illustrates an example process for processing an image to obtain information to support automation of conversations between customers and customer service agents.

FIG. 2 illustrates an example process for processing an image to obtain information to support automation of conversations between customers and customer service agents. It will be appreciated that the process 200 of FIG. 2 may be performed within the context of supporting automation of conversations between customers and customer service agents as presented with respect to the system 100 of FIG. 1.

As depicted in FIG. 2, the process 200 of FIG. 2 receives an image within the context of a conversation between a customer and a customer service agent (illustrated as image 205) and outputs information for the conversation between the customer and the customer service agent (illustrated as information 225). As depicted in FIG. 2, the process 200 includes an image processing model 210 and an information determination model 220.

The image processing model 210 is configured to process the image 205 to extract a set of features 215 of the image 205. As illustrated in FIG. 2, the image processing model 210 may be a CNN (illustratively, CNN 210-C which is provided as an example of the image processing model 210); however it will be appreciated that various other image processing models may be used to process the image 205 to extract the set of features 215 of the image 205.

The CNN 210-C is configured to extract a dense representation of the image 205 (which also may be referred to as an embedding of the image 205). The CNN 210-C can create a dense feature vector, which also may be referred to as an embedding, from the image 205 as illustrated in FIG. 2. Namely, as illustrated in FIG. 2, the CNN 210-C includes a first convolution layer, a first sub-sampling layer, a second convolution layer, a second sub-sampling layer, and a fully-connected multi-layer perceptron (MLP) layer. The first convolution layer processes the image 205, based on convolution, to produce a set of feature maps (illustratively 4 feature maps; although it will be appreciated that fewer or more feature maps may be used). The first sub-sampling layer performs subsampling of the set of feature maps produced by the first convolution layer to produce a set of feature maps (illustratively 4 feature maps; although it will be appreciated that fewer or more feature maps may be used). The second convolution layer processes the set of feature maps produced by the first sub-sampling layer, based on convolution, to produce a set of feature maps (illustratively 6 feature maps; although it will be appreciated that fewer or more feature maps may be used). The second sub-sampling layer performs subsampling of the set of feature maps produced by the second convolution layer to produce a set of feature maps (illustratively 6 feature maps; although it will be appreciated that fewer or more feature maps may be used). The MPL layer processes the set of feature maps produced by the second sub-sampling layer to create the dense feature vector, or embedding, of the image 205. This dense feature vector, or embedding, of the image 205 is the set of features 215 of the image 205 which is further processed by the information determination model 220 as discussed below. It will be appreciated that the CNN 210-C may be configured in other ways (e.g., using other numbers, types, or arrangements of layers), other types of CNNs may be used, and so forth.

It will be appreciated that various other types of image processing models 210 may be used to process the image 205 to extract the set of features 215 of the image 205.

The information determination model 220 is configured to process the set of features 215 of the image 205 to determine the information 225. The information determination model 220 may be an information generation model, an information extraction model, and so forth. The information 225 includes information for the conversation between the customer and the customer service agent which may be used to continue the conversation between the customer and the customer service agent (e.g., a need of the customer (e.g., expressed in the form of a question of the customer), an answer for the customer, and so forth).

In one example, as indicated above, the information determination model 220 may be an information generation model configured to generate the information 225 based on the set of features 215 of the image 205 (e.g., the embeddings from CNN 210-C). The information generation model may be a text generation model or other suitable information generation model. The information generation model may be neural network model. The information generation model may be configured to generate text that describes the need of the customer. The information 225 that is generated may be a need of the customer (e.g., expressed as a statement of a need, expressed as a question, and so forth) or other types of information which may be generated for the customer.

In one example, as indicated above, the information determination model 220 may be an information extraction model configured to extract the information 225 based on the set of features 215 of the image 205 (e.g., the embeddings from CNN 210-C). The information extraction model may be a classification model, a prediction model, and the like, or any other suitable information extraction model. The information extraction model may be configured to extract answers to questions (e.g., diagnostic questions, product information questions, and the like). The information 225 that is generated may be an answer for the customer (e.g., an answer to a question asked by the customer, an answer to a question predicted for the customer (e.g., predicted based on processing of the image 205 or based on any earlier received and processed image), and so forth).

It will be appreciated that various other types of downstream models may be configured to operate downstream of the image processing model 210 for determining information 225 which may be used to support automation of the conversation between the customer and the customer service agent.

It will be appreciated that process 200 may be modified in various ways while still supporting processing of the image 205 to obtain the information 225. For example, various other types of information determination models 220 may be used to process the set of features 215 of the image 205 to obtain the information 225. For example, various combinations of the various models described above may be combined in various ways to support processing of the image 205 to obtain the information 225. For example, various other numbers and types of models may be used, in various serial and/or parallel combinations, to support processing of the image 205 to obtain the information 225. It will be appreciated that process 200 may be modified in various other ways while still supporting processing of the image 205 to obtain the information 225.

Figure 3:
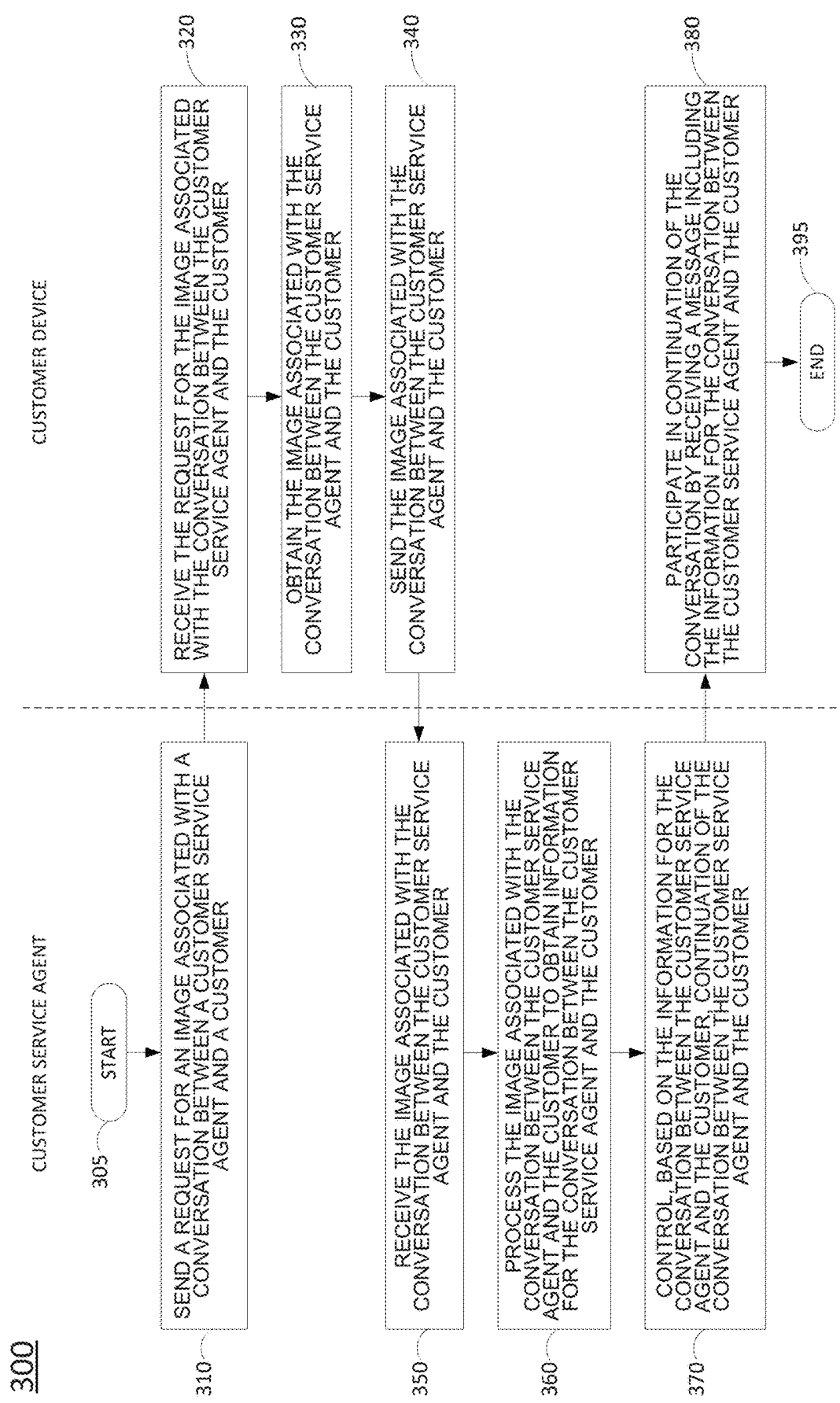
FIG. 3 illustrates a flowchart of an example method for supporting automation of a conversation between a customer and a customer service agent.
Figure 4:
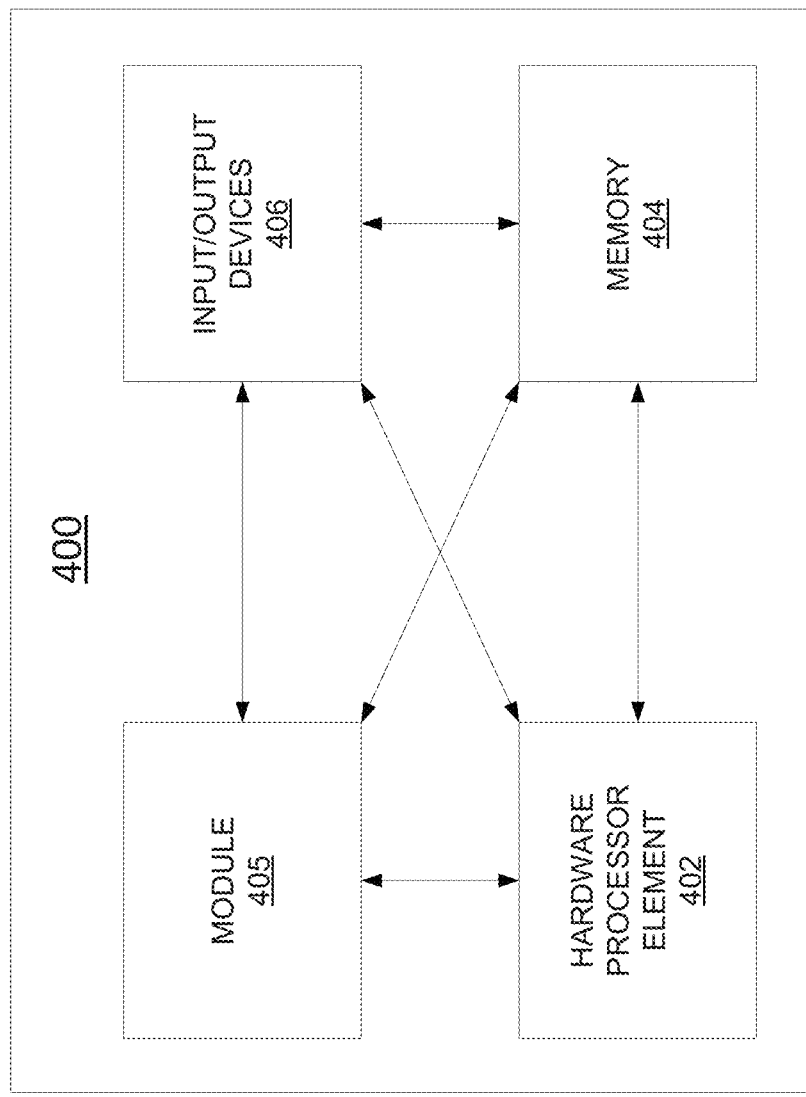
FIG. 4 illustrates a high level block diagram of a computing system specifically programmed to perform the steps, functions, blocks and/or operations described herein.

It will be appreciated that various functions for supporting automation of customer service based on support for automation of conversations between customers and customer service agents as discussed within the context of system 100 of FIG. 1 and the process 200 of FIG. 2 may be further understood by way of reference to FIG. 3 and FIG. 4.

FIG. 3 illustrates a flowchart of an example method for supporting automation of a conversation between a customer and a customer service agent. As illustrated in FIG. 3, a portion of the steps of method 300 are performed by a customer service agent (e.g., an automated customer service agent 131-A of FIG. 1 or a customer service agent terminal or other device or element on behalf of a human customer service agent 131-H of FIG. 1) and a portion of the steps of method 300 are performed by a customer device of the customer (e.g., a customer device 110 of a customer 101 of FIG. 1). In one example, the steps, functions, and/or operations of method 300 depicted as being performed by the customer service agent may be performed by a computing device or processing system, such as the computing system 400 and/or the hardware processor element 402 as described with respect to FIG. 4. Similarly, in one example, the steps, functions, and/or operations of method 300 depicted as being performed by the customer device may be performed by a computing device or processing system, such as the computing system 400 and/or the hardware processor element 402 as described with respect to FIG. 4. For illustrative purposes, the method 300 is described in greater detail below in connection with an example in which functions performed by the customer service agent are performed by a processing system of the customer service agent and in which functions performed by the customer device are performed by a processing system of the customer device.

As illustrated in FIG. 3, the method 300 begins in step 305 and proceeds to step 310.

At step 310, the processing system of the customer service agent may send a request for an image associated with a conversation between a customer service agent and a customer. At step 320, the processing system of the customer device may receive the request for the image associated with the conversation between the customer service agent and the customer. In one example, the image associated with the conversation between the customer service agent and the customer is related to a topic of the conversation between the customer service agent and the customer. In one example, the request for the image associated with the conversation between the customer service agent and the customer is sent based on detection of content within the conversation between the customer service agent and the customer. In one example, the request for the image associated with the conversation between the customer service agent and the customer is sent and received within the conversation between the customer service agent and the customer.

At step 330, the processing system of the customer device may obtain the image associated with the conversation between the customer service agent and the customer. In one example, the image associated with the conversation between the customer service agent and the customer may be obtained by capturing an image with a camera of the customer device of the customer. In one example, the image associated with the conversation between the customer service agent and the customer may be obtained by capturing an image using a screen capture capability at the customer device of the customer.

At step 340, the processing system of the customer device may send the image associated with the conversation between the customer service agent and the customer. At step 350, the processing system of the customer service agent may receive the image associated with the conversation between the customer service agent and the customer. In one example, the image associated with the conversation between the customer service agent and the customer is sent and received within the conversation between the customer service agent and the customer.

At step 360, the processing system of the customer service agent may process the image associated with the conversation between the customer service agent and the customer to obtain information for the conversation between the customer service agent and the customer. In one example, the processing of the image associated with the conversation between the customer service agent and the customer to obtain the information for the conversation between the customer service agent and the customer may include processing the image based on a first model to obtain a set of features of the image and processing the set of features of the image based on a second model to obtain the information for the conversation between the customer service agent and the customer. In one example, the first model is an image processing model. In one example, the image processing model is a convolutional neural network (CNN). In one example, the second model is an information generation model. In one example, the information generation model is a neural network model. In one example, the information for the conversation between the customer service agent and the customer is a need of the customer. In one example, the second model is an information extraction model. In one example, the information extraction model is at least one of a classification model and a prediction model. In one example, the information for the conversation between the customer service agent and the customer is an answer for the customer. In one example, the information for the conversation between the customer service agent and the customer is at least one of a need of the customer and an answer for the customer.

At step 370, the processing system of the customer service agent may control, based on the information for the conversation between the customer service agent and the customer, continuation of the conversation between the customer service agent and the customer. In one example, controlling continuation of the conversation between the customer service agent and the customer includes sending, within the conversation between the customer service agent and the customer, a message including the information for the conversation between the customer service agent and the customer. In one example, the message further includes a request for the customer to verify the information for the conversation between the customer service agent and the customer.

At step 380, the processing system of the customer device may participate in continuation of the conversation by receiving a message including the information for the conversation between the customer service agent and the customer. In one example, the message further includes a request for the customer to verify the information for the conversation between the customer service agent and the customer.

As illustrated in FIG. 3, following step 380, the method 300 proceeds to step 395 where the method 300 ends.

It will be appreciated that, although method 300 is depicted as ending (for purposes of clarity), the conversation between the customer service agent and the customer may continue and may reuse the method 300 for processing one or more additional images in order to facilitate further automation of the conversation between the customer service agent and the customer.

It will be appreciated that the method 300 may be expanded to include additional steps, or may be modified to replace steps with different steps, to combine steps, to omit steps, to perform steps in a different order, and so forth. For instance, in one example the processing system may repeat one or more steps of the method 300 (e.g., obtaining and processing one or more additional images for purposes of further automating the conversation between the customer and the customer service agent). Thus, it will be appreciated that these and other modifications are all contemplated within the scope of the present disclosure.

It will be appreciated that, although not expressly specified above, one or more steps of the method 300 may include a storing, displaying, and/or outputting step as required for a particular application. In other words, any data, records, fields, and/or intermediate results discussed in the method(s) can be stored, displayed, and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative example and is not intended to indicate that steps not labelled as optional steps to be deemed to be essential steps. Furthermore, operations, steps, or blocks of the above described method(s) can be combined, separated, and/or performed in a different order from that described above, without departing from the examples of the present disclosure.

It will be appreciated that various examples for supporting automation of conversations between customers and customer service agents as presented herein may provide various advantages or potential advantages. For example, various examples for supporting automation of conversations between customers and customer service agents may support improved conversational quality between customers and chatbots. For example, various examples for supporting automation of conversations between customers and customer service agents may support improved conversational quality between customers and chatbots in a manner that obviates the need for customers to more accurately describe their needs to the chatbot and that also obviates a need for the chatbot to support additional flexibility and intelligence to react and adapt to the complexity of language used by customers (e.g., by relying on processing of an image(s) to extract information, rather than relying on the customer to provide that information conversationally and relying on the chatbot to understand that information within a conversational context). For example, various examples for supporting automation of conversations between customers and customer service agents may provide chatbots with the ability to read important information from images. For example, various examples for supporting automation of conversations between customers and customer service agents may enable information requested by the chatbot to be accurately captured by a picture without limitation on customer capability. For example, various examples for supporting automation of conversations between customers and customer service agents may enable chatbots to collect accurate information more efficiently and to reply to customers more smoothly. For example, various examples for supporting automation of conversations between customers and customer service agents may enable chatbots to complete various tasks that might otherwise have to be completed by human customer service agents. For example, various examples for supporting automation of conversations between customers and customer service agents may enable chatbots to answer inquiries by customers cheaply, quickly, and in real-time. For example, various examples for supporting automation of conversations between customers and customer service agents may improve communication efficiency (e.g., by avoiding clumsy questions or incorrect answers since, when talking to a chatbot, the customer just needs to take one action to upload the picture instead of typing requested information in several conversational turns), improve customer experience, support automation of various functions which are not currently supported by chatbots, and so forth. It will be appreciated that, although primarily described with respect to advantages or potential advantages for automated customer service agents, such as chatbots, various advantages or potential advantages also may be provided for human customer service agents (e.g., using various devices which may be configured to provide such capabilities within the context of conversations between customers and human customer service agents). It will be appreciated that various examples for supporting automation of conversations between customers and customer service agents as presented herein may provide various other advantages or potential advantages.

It will be appreciated that, as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures and the like which may cause a processing system executing computer-readable instructions, code, and/or programs to function differently depending upon the values of the variables or other data structures that are provided. As referred to herein a "processing system" may include a computing device, or computing system, including one or more processors, or cores (e.g., as illustrated in FIG. 4 and discussed below) or multiple computing devices collectively configured to perform various steps, functions, and/or operations in accordance with the present disclosure.

FIG. 4 depicts a high-level block diagram of a computing system 400 (e.g., a computing device or a processing system) specifically programmed to perform functions described herein. For example, any one or more components or devices illustrated in FIG. 1, described in connection with the process 200 of FIG. 2, or described in connection with the method 300 of FIG. 3, may be implemented as the computing system 400. As depicted in FIG. 4, the computing system 400 includes a hardware processor element 402 (e.g., including one or more hardware processors, which may include one or more microprocessor(s), one or more central processing units (CPUs), and/or the like, where the hardware processor element 402 also may represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for supporting conversations between customers and customer service agents, and one or more input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It will be appreciated that, although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 also may be configured or programmed to cause other devices to perform one or more operations as discussed above. In other words, the hardware processor element 402 may serve the function of a central controller directing other devices to perform the one or more operations as discussed above.

It will be appreciated that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the module 405 for supporting conversations between customers and customer service agents (e.g., a software program include computer-executable instructions) can be loaded into memory 404 and executed by hardware processor element 402 to implement the steps, functions and/or operations as discussed above in connection with the example method 300 of FIG. 3. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the module 405 for supporting conversations between customers and customer service agents (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method, comprising:
   sending, by a processing system including at least one processor, a request for an image associated with a conversation between a customer service agent and a customer, wherein the customer service agent comprises a chatbot, and wherein the request for the image associated with the conversation between the customer service agent and the customer is sent based on detection of content within the conversation between the customer service agent and the customer;
   receiving, by the processing system, the image associated with the conversation between the customer service agent and the customer;
   processing, by the processing system, the image associated with the conversation between the customer service agent and the customer, wherein the processing comprises:
   processing, by the processing system, the image using a convolutional neural network to obtain a dense feature vector of the image; and
   processing, by the processing system, the dense feature vector of the image using a neural network, different from the convolutional neural network, to generate text which describes a need of the customer; and
   controlling, by the processing system based on the need of the customer, continuation of the conversation between the customer service agent and the customer.

2. The method of claim 1, wherein the image associated with the conversation between the customer service agent and the customer is related to a topic of the conversation between the customer service agent and the customer.

3. The method of claim 1, wherein the request for the image associated with the conversation between the customer service agent and the customer is sent within the conversation between the customer service agent and the customer.

4. The method of claim 1, wherein the image associated with the conversation between the customer service agent and the customer is received within the conversation between the customer service agent and the customer.

5. The method of claim 1, wherein the need of the customer comprises an answer for the customer.

6. The method of claim 1, wherein the controlling is further based on an answer for the customer.

7. The method of claim 1, wherein the controlling continuation of the conversation between the customer service agent and the customer comprises:
   sending, by the processing system within the conversation between the customer service agent and the customer, a message including the need of the customer.

8. The method of claim 7, wherein the message further includes a request for the customer to verify the need of the customer.

9. The method of claim 7, wherein the message is generated as a text-based message.

10. The method of claim 7, wherein the message is generated using text-to-voice conversion.

11. The method of claim 1, wherein the convolutional neural network comprises:
   a first convolution layer to processes the image, based on convolution, to produce a first set of feature maps;
   a first sub-sampling layer to perform subsampling of the first set of feature maps to produce a second set of feature maps;
   a second convolution layer to process the second set of feature maps, based on convolution, to produce a third set of feature maps;
   a second sub-sampling layer to perform subsampling of the third set of feature maps to produce a fourth set of feature maps; and a multi-layer perceptron layer to process the fourth set of feature maps to create the dense feature vector of the image.

12. The method of claim 1, wherein the need of the customer comprises a predicted question of the customer.

13. The method of claim 1, wherein the processing system requests the image based on a workflow with which the conversation is associated.

14. The method of claim 1, wherein the processing system requests the image based on a keyword detected within the conversation, where the keyword is indicative of the need of the customer.

15. The method of claim 1, wherein the processing system requests the image based on an option selected by the customer when initiating the conversation.

16. The method of claim 1, wherein the processing system requests that the image to be provided via a communication channel outside of a context of the conversation.

17. An apparatus, comprising:
a processing system including at least one processor; and
a computer-readable medium storing instructions which, when executed by the processing system, cause the processing system to perform operations, the operations comprising:
   sending a request for an image associated with a conversation between a customer service agent and a customer, wherein the customer service agent comprises a chatbot, and wherein the request for the image associated with the conversation between the customer service agent and the customer is sent based on detection of content within the conversation between the customer service agent and the customer;
   receiving the image associated with the conversation between the customer service agent and the customer;
   processing the image associated with the conversation between the customer service agent and the customer, wherein the processing comprises:
      processing the image using a convolutional neural network to obtain a dense feature vector of the image; and
      processing the dense feature vector of the image using a neural network, different from the convolutional neural network, to generate text which describes a need of the customer; and
   controlling, based on the need of the customer, continuation of the conversation between the customer service agent and the customer.

18. The apparatus of claim 17, wherein the convolutional neural network comprises:
a first convolution layer to processes the image, based on convolution, to produce a first set of feature maps;
a first sub-sampling layer to perform subsampling of the first set of feature maps to produce a second set of feature maps;
a second convolution layer to process the second set of feature maps, based on convolution, to produce a third set of feature maps;
a second sub-sampling layer to perform subsampling of the third set of feature maps to produce a fourth set of feature maps; and
a multi-layer perceptron layer to process the fourth set of feature maps to create the dense feature vector of the image.

19. A method, comprising:
receiving, by a processing system including at least one processor, a request for an image associated with a conversation between a customer service agent and a customer, wherein the customer service agent comprises a chatbot;
obtaining, by the processing system, the image associated with the conversation between the customer service agent and the customer;
sending, by the processing system, the image associated with the conversation between the customer service agent and the customer; and
receiving, by the processing system within the conversation between the customer service agent and the customer, a message including information for the conversation between the customer service agent and the customer, wherein the information for the conversation between the customer service agent and the customer is based on processing of the image by the customer service agent, and wherein the processing comprises using a convolutional neural network that processes the image to obtain a dense feature vector of the image and using a neural network, different from the convolutional neural network, that processes the dense feature vector of the image to generate text which describes the information for the conversation between the customer service agent and the customer.

20. The method of claim 19, wherein the convolutional neural network comprises:
a first convolution layer to processes the image, based on convolution, to produce a first set of feature maps;
a first sub-sampling layer to perform subsampling of the first set of feature maps to produce a second set of feature maps;
a second convolution layer to process the second set of feature maps, based on convolution, to produce a third set of feature maps;
a second sub-sampling layer to perform subsampling of the third set of feature maps to produce a fourth set of feature maps; and
a multi-layer perceptron layer to process the fourth set of feature maps to create the dense feature vector of the image.

* * * * *